United States Patent
Zalio

(10) Patent No.: US 7,995,539 B2
(45) Date of Patent: Aug. 9, 2011

(54) METHOD OF SCHEDULING CELL SEARCH OPERATIONS

(75) Inventor: Filip Zalio, Victoria (AU)

(73) Assignee: NEC Corporation, Tokyo (JP)

( * ) Notice: Subject to any disclaimer, the term of this patent is extended or adjusted under 35 U.S.C. 154(b) by 721 days.

(21) Appl. No.: 11/579,543

(22) PCT Filed: May 23, 2005

(86) PCT No.: PCT/JP2005/009825
§ 371 (c)(1),
(2), (4) Date: Jun. 16, 2008

(87) PCT Pub. No.: WO2005/114860
PCT Pub. Date: Dec. 1, 2005

(65) Prior Publication Data
US 2008/0254803 A1    Oct. 16, 2008

(30) Foreign Application Priority Data

May 21, 2004  (AU) ................................ 2004902745
Apr. 28, 2005  (AU) ................................ 2005201793

(51) Int. Cl.
*H04B 7/216* (2006.01)
(52) U.S. Cl. ........ 370/335; 370/328; 370/350; 455/436; 455/442
(58) Field of Classification Search .................. 455/442, 455/552, 432, 435.2, 436; 370/335
See application file for complete search history.

(56) References Cited

U.S. PATENT DOCUMENTS

| 6,724,745 B1 | 4/2004 | Hunzinger |
| 6,894,995 B2 * | 5/2005 | Chitrapu et al. ............... 370/335 |
| 7,089,004 B2 * | 8/2006 | Jeong et al. .................... 455/436 |
| 2004/0023634 A1 | 2/2004 | Jeong et al. |

OTHER PUBLICATIONS

Chinese Office Action dated Sep. 19, 2008.
$3^{rd}$ Generation Partnership Project TS 25.215 V6.0.0.; Technical Specification Group Radio Access Network; Physical layer-Measurements (FDD); pp. 14-16;Dec. 2003.
Japanese Office Action dated Feb. 17, 2009 with Partial English-Language Translation.
Ooishi, et al., "Wireless System of W-CDMA System", Fujitsu, Japan, Fujitsu Limited, Jan. 10, 200, vol. 51, No. 1, pp. 13-18.

* cited by examiner

*Primary Examiner* — David Q Nguyen
(74) *Attorney, Agent, or Firm* — McGinn IP Law Group, PLLC

(57) ABSTRACT

A method of scheduling cell search activity in a mobile communication user terminal (28) during transmission gap sequencing in burst mode, the method comprising the steps of:
maintaining (404) a table (62) of regular periodic patterns of discreet cell search commands for execution during the transmission gap sequences, wherein the commands are ordered by the desired execution times; and
sequentially executing commands (408-414) in the table at the desired execution time.

18 Claims, 8 Drawing Sheets

METHOD OF SCHEDULING CELL SEARCH OPERATIONS

FIELD OF THE INVENTION

The present invention relates generally to the scheduling of cell search operations in a mobile communications user terminal, and in particular to the scheduling of cell search operations during transmission gap sequences in burst mode. The present invention is suitable for use in scheduling cell search operations during transmission gap Sequences in compressed mode in mobile W-CDMA systems, and it will be convenient to describe the invention in relation to that exemplary application. It is to be appreciated however, that the invention is not limited to use in that application only.

DESCRIPTION OF THE RELATED ART

Mobile phone systems are required to use a scheme that allows the mobile station to find and analyze radio signals from one or more base stations, often on different radio frequencies. The process of searching for different base stations is called cell search. During the cell search process, the mobile station identifies all base stations and determines which of them are the most suitable for "camping". Camping on the cell means starting to monitor whether there is an incoming call or allow the user to make an outgoing call. The cell search has to be performed Periodically because when the moving station is moving, the cell that has been identified as the best may have a reduced Signal quality whilst the radio signal from another cell may have improved. Based upon repeated cell searching, the mobile station keeps a periodically updated list of all available cells. When the signal quality from the currently used cell has dropped below a certain threshold, the mobile station stops monitoring the current cell and camps on a new cell, that is to say, the mobile station performs reselection.

In most mobile systems, such as W-CDMA, a periodic cell search has to be performed even when there is a call in Progress so that the handover from one cell to the next can be performed and the call in progress is not dropped if the signal from the currently used cell diminishes in quality whilst there is another cell available with better signal quality.

Moreover, in mobile systems which rely upon spread spectrum, such as W-CDMA, the transmission and reception protocol is often designed in such a way to allow for a mobile station to temporarily stop transmitting and receiving, and to perform a cell search on a different radio channel. The momentary interruption of transmission and reception does not cause any data loss, because both the mobile station and the base station compensate by temporally increasing the data transmission speed so as to maintain an overall average data transmission speed. In some mobile W-CDMA system, such as UMTS, this feature is called compressed mode. The compressed mode is typically controlled by a telecommunications network. Prior to activation of a sequence of transmission Pauses or gaps, the network communicates the exact timing of the gaps to the mobile terminal using a control channel. The mobile terminal is then expected to use the provided transmission gap sequences to perform cell search and measurements on frequencies different than the current nominal frequency. This is referred to as inter-frequency cell search or measurement, or inter-frequency activity.

For mobile terminals that support multiple radio access technologies, such as a dual W-CDMA and GSM terminal, the network can provide compressed mode gap sequences for performing neighbor cell search activity on radio access technology, different from the one the mobile terminal is currently connected to. This is omen called inter-system activity. The network can provide several different compressed mode gap sequences at the same time, for example some gap sequences for inter-frequency activity and some gap sequences for inter-system activity.

In some mobile W-CDMA systems, such as UMTS, the cell search activities can have "bursty" characteristics involving temporary Pausing and resuming Of activity, in scenarios other than activation of compressed mode. For example, in forward access state, the terminal may be performing cell search on one radio channel, whilst being Camped on a cell on a different radio channel at the same time. In this case, the cell search must be paused during those occasions when the terminal is transmitting bursts of data on the forward access channel. On other occasions, the mobile terminal may be idle (not in connection) but is periodically activated for short time durations, to perform monitoring of the paging channel and carry out a burst of cell search activity on one nominal channel frequency followed by another burst on a different radio frequency. Such a case is similar to performing compressed mode intra-frequency and inter-frequency activity.

It would be advantageous to provide a method for performing cell search activity during one or more different types of bursty activity. It would be particularly advantageous to provide a generic method of scheduling cell search activity able to be used by a mobile terminal regardless of the type of bursty activity involved. It would also be advantageous to provide a generic scheduling method that is simple to develop, test and/or implement when compared to current scheduling methods involving dedicated methods and techniques for each type of bursty activity. Moreover, it would be advantageous to Provide a cell search activity scheduling method able to be efficiently implemented in a mobile terminal.

With this in mind, one aspect of the invention provides a method of scheduling cell search activity in a mobile communication user terminal during transmission gap sequencing in burst mode, the method comprising the steps of:

maintaining a table of regular periodic patterns of discreet cell search commands for execution during the transmission gap sequences, wherein the commands are ordered by the desired execution times; and sequentially executing commands in the table at the desired execution time.

The cell search commands may include pause and resume commands for pausing and resuming any two or mops of intra-frequency, inter-frequency or inter-system cell search activity. Burst mode may include W-COMA compressed mode.

SUMMARY OF THE INVENTION

The method may further include the step of calculating the table of regular periodic patterns of discreet cell search commands under one or more predefined conditions.

The predefined conditions may include when burst mode is required and there is a need to interleave separate cell search activities.

The predefined conditions may further include when cell search activities are required to be performed and a final command from the table has been executed.

The predefined conditions may further include when new patterns of discreet cell search commands are received from a communications network while cell search activities are currently being executed.

The method may further includes the step of calculating the table of regular periodic patterns of discreet cell search commands by:

decomposing all active burst mode patterns into regular periodic patterns of discreet commands;

storing discreet commands and command execution time in the table; and sorting the commands in the table according to desired execution time.

The following description refers in more detail to the various features of the cell search activity scheduling method of the present invention. To facilitate an understanding of the invention, reference is made in the description to the accompanying drawings where the invention is illustrated in a preferred embodiment. It is to be understood however, that the invention is not limited to the preferred embodiment illustrated in the drawings.

DESCRIPTION OF THE PREFERRED EMBODIMENT

Figure 1:
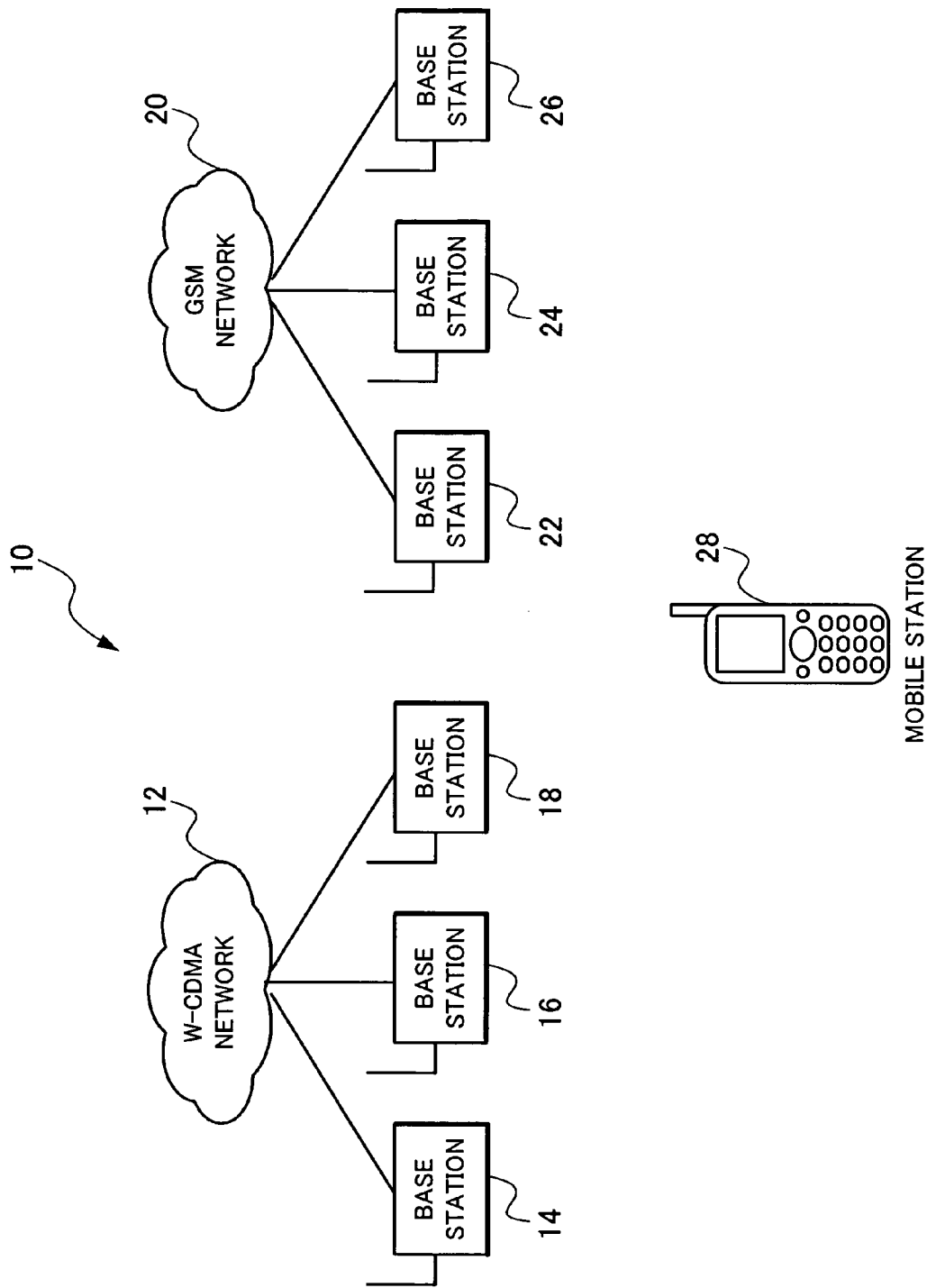
FIG. 1 is a schematic diagram illustrating a multiple radio access network.

Referring now to FIG. 1, there is shown generally a wireless communications system 10 including a W-CDMA network 12 and base stations 14, 16 and 18. The wireless communications system 10 also includes a second radio access network, in this case a GSM network 20, and base stations 22, 24 and 26. A mobile station 28 is adapted to receive a number of radio signals transmitted from cells served by the base stations 14, 16 and 18, and also from the base stations 22 to 26, depending upon the radio access technology currently selected by the mobile station 28. It will be appreciated that whilst the events will be described in relation to radio access technologies only, namely W-CDMA and GSM, the present invention is applicable to other multiple radio access technologies in which a mobile station is adapted to communicate with multiple radio networks.

Figure 2:
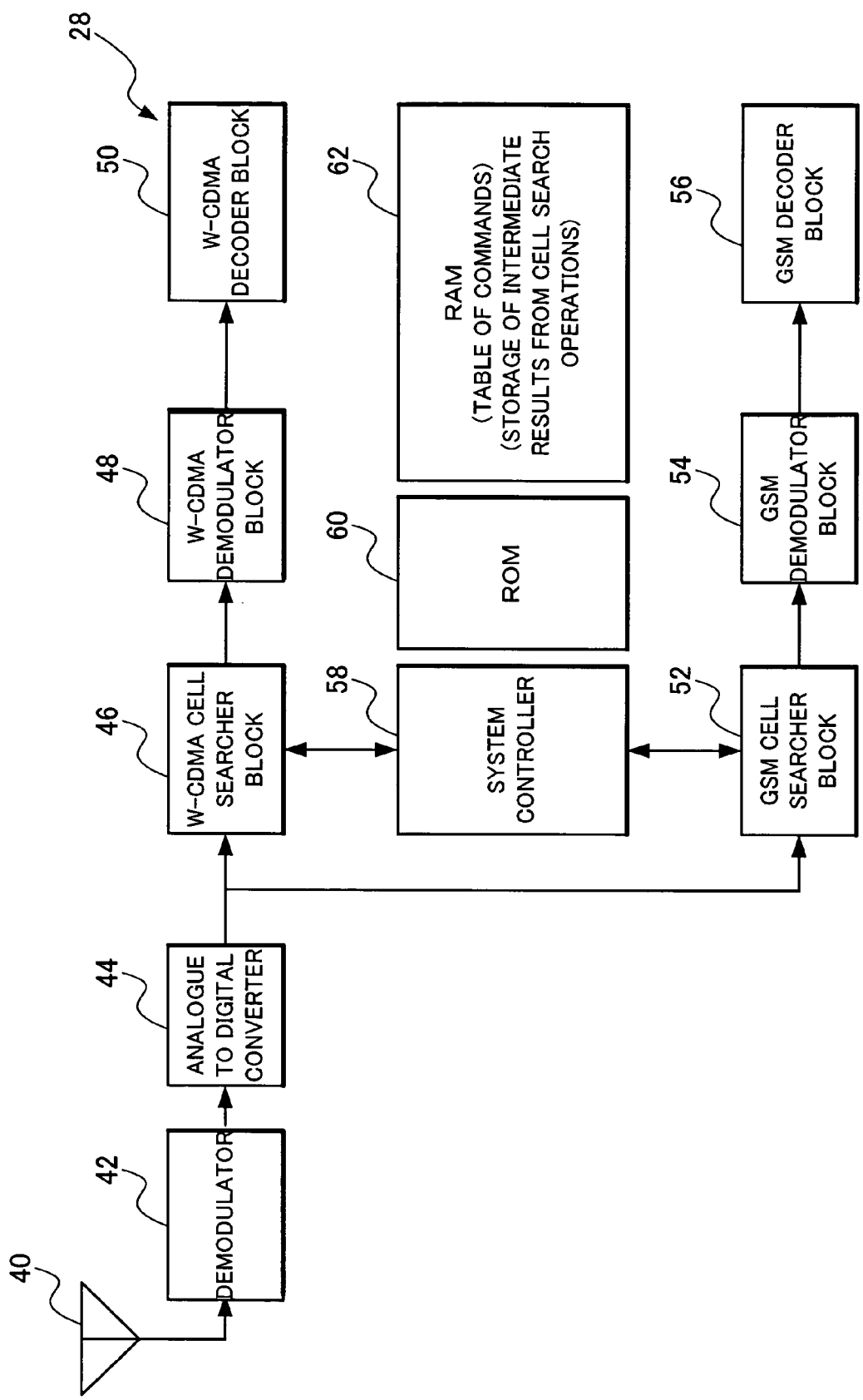
FIG. 2 is a schematic diagram of selected functional elements of a mobile station forming part of the multiple radio access technology network shown in FIG. 1.
Figure 3:
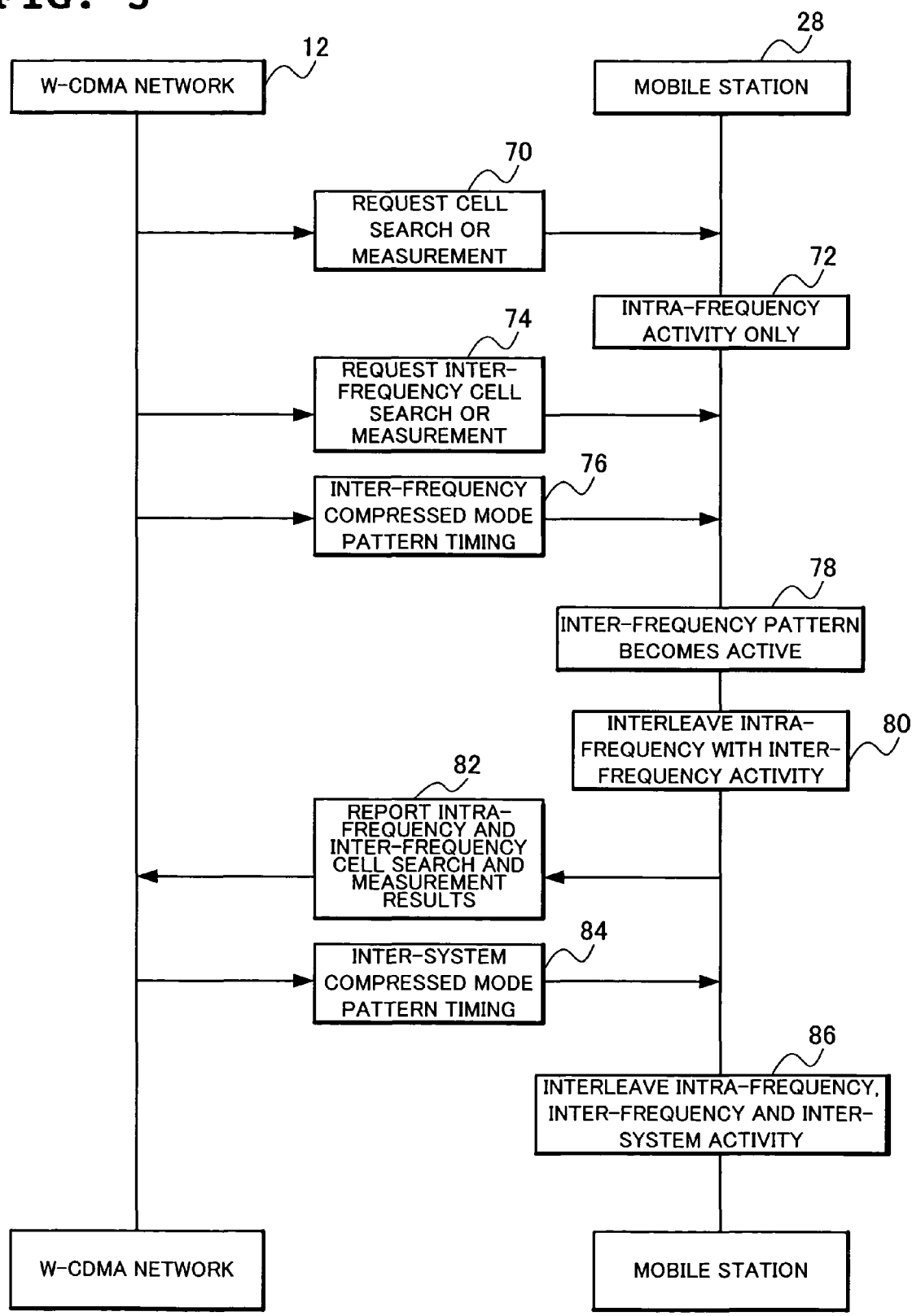
FIG. 3 is a now chan showing various cell search activities undertaken during intra-frequency, inter-frequency and inter-system cell search activities.

FIG. 2 is a schematic diagram showing selected elements of the mobile station 28. The mobile station 28 includes an antenna 40, a demodulator 42 for down conversion of received radio signals to a base band frequency, and an analogue to digital converter 44 for digitizing the down converted and demodulated signals. The mobile station 28 further includes a W-CDMA branch, including a W-CDMA cell searcher block 46 for search for a cell served by one of the base stations 14, 16 and 18 and determining the down link scrambling code and frame synchronization for that cell. A W-CDMA demodulator block 48 demodulates the code output from the W-CDMA cell searcher block 46 with detected spread codes, whilst a W-CDMA decoder block 50 acts to decode the demodulated signals output by the W-CDMA demodulator block 48. Similarly, the mobile station 28 includes a GSM arm, including a GSM cell searcher block 52, a GSM demodulator block 54 and a GSM decoder block 56, having functionality similar to the corresponding blocks in the W-CDMA arm of the mobile station 28. Selective operation of the cell searcher blocks 46 and 52 is controlled by a system controller 58. A first memory device 60 is provided for storing a series of program instructions controlling operation of the system controller 58, and a second volatile memory device 62 is provided for the temporary storage of data for use by the system controller 58 in performing cell Search operations.

A typical scenario in which cell search activities are undertaken by the mobile station 28 is illustrated in FIG. 1. At step 70 the W-CDMA network 12 sends a request to the mobile station 28 to perform intra-frequency cell search activities. The commands to be performed during intra-frequency cell search, and the timing of those commands, are maintained in the volatile memory 62 of the mobile station 28. At step 72, the mobile station 28 carries out that intra-frequency cell search activity.

At step 74 however the W-CDMA network 12 sends a request to the mobile station 28 to conduct inter-frequency cell search activity. In other words, rather than conduct an intra-frequency cell search in which the cell having the strongest signal transmitted on the same frequency as the signal currently being received by the mobile station 28, a search is conducted for cells served by base stations forming part of the W-CDMA network 12 on other frequencies. The inter-frequency compressed mode pattern timing is transmitted to the mobile terminal 28 from the W-CDMA network 12 at step 76. The pattern timing is stored in the volatile memory 62 of the mobile station 28. At a time determined by the data maintained in the volatile memory 62, the inter-frequency pattern becomes active at step 78. At step 80, both intra-frequency and inter-frequency cell search activities are operative, so that the two cell search functions are required to be interleaved. At step 82, the mobile station 28 reports back to the W-CDMA network 12 the results of the intra-frequency and inter-frequency cell search activities.

As step 84, the W-CDMA network 12 may request that the mobile station 28 carry out inter-system cell search activities. That is, rather than performing cell search activities in the W-CDMA network 12, the mobile station may undertake cell search activities in the GSM network 20. The inter-system compressed mode pattern timing is also transmitted to the mobile station 28 in step 84. At step 86, the intra-frequency, inter-frequency and inter-system cell search activities are interleaved.

The system controller 58 causes selective operation of the cell searcher blocks 46 and 42 of the mobile station 28 in order to allow for temporary pausing of processing of each of the cell search activities at an exactly specified time, and allow later resumption, at an exactly specified time of that same cell searching activity. Storage of intermediate results of that cell search activity is provided for in the volatile memory 62, so that any two or more of the intra-frequency, inter-frequency and inter-system cell search activities can be interleaved.

Figure 4:
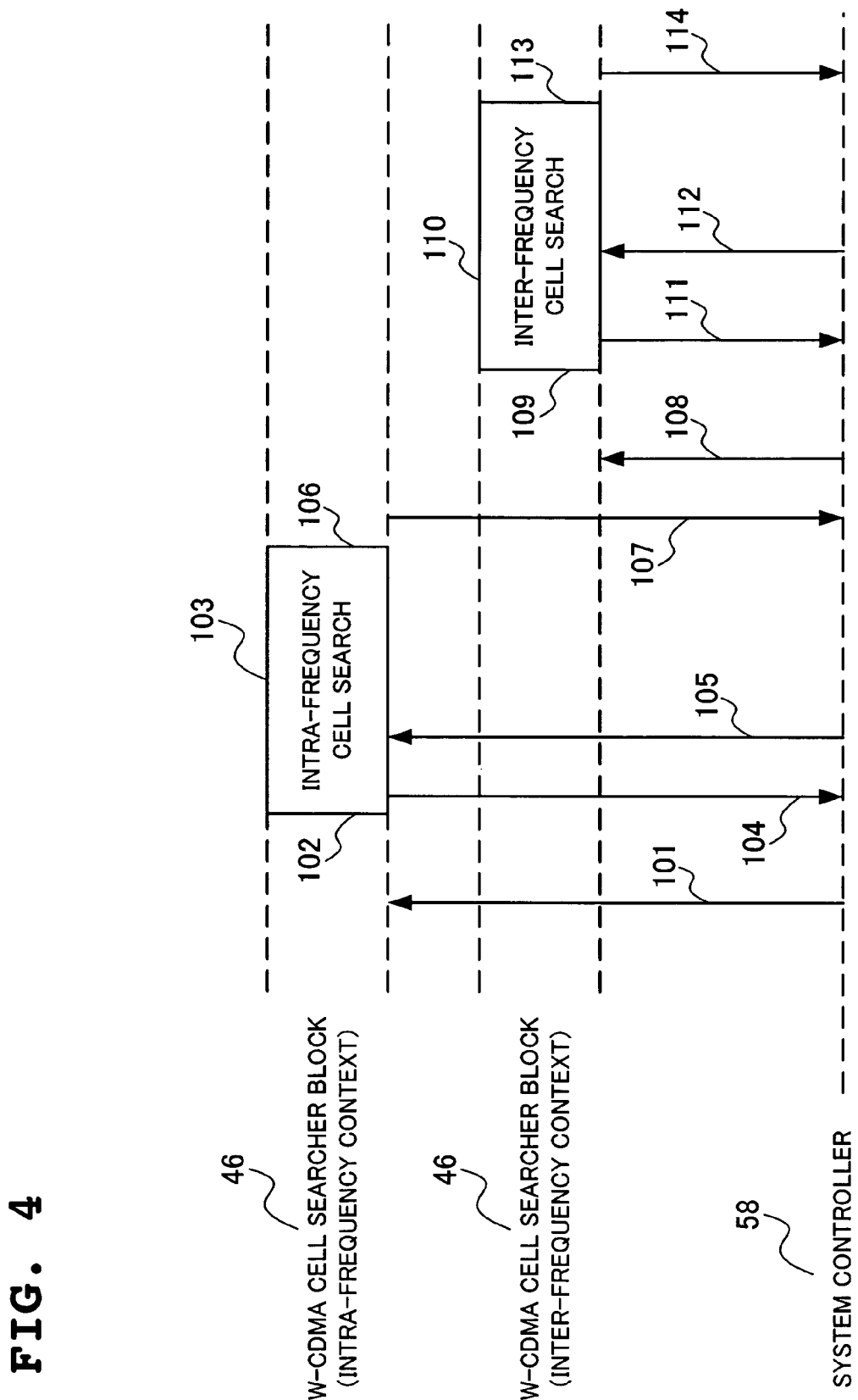
FIG. 4 is a timing diagram showing sequences of operations performed by the mobile station illustrated in FIG. 2 during intra-frequency cell search activity and inter-frequency cell search activity.

An example of the sequence of operations undertaken in such interleaved cell search activities is illustrated in FIG. 4. In this figure, the system controller 58 issues an intra-frequency cell search request 101 to the W-CDMA cell searcher block 46. This request contains the exact starting time of an intra-frequency burst. The cell searcher block 46 starts the cell search activity at a start time 102. Preferably, the timing of the operations controlled by the system controller 58 is implemented in hardware, enabling precise timing of the cell search activities via a system clock cycle. Immediately after the cell searcher block 46 commences intra-frequency cell search operations 103, an acknowledgement 104 is sent to the system controller 58. The system controller then determines that the next required cell search activity is a pause of intra-frequency searching at an exact time 106, and accordingly sends to the cell searcher block 46 a request 105 for this pause. After the cell searcher block 46 pauses, an acknowledgement 107 is returned from the cell searcher block 46 to the system controller 58.

After receiving the acknowledgement 107, the system controller 58 then determines that the next command to be issued is a resume of inter-frequency cell searching 110 to be initiated at an exact point in time 109. Accordingly, the system controller 58 sends a corresponding request 108 to the W-CDMA cell search block 46 to initiate the inter-frequency cell search activity 110. Immediately after the cell block 46 commences the inter-frequency cell search activity, an acknowledgement 111 is returned to the system controller 58. The system controller 58 determines that the required operation is a pause of the inter-frequency search at an exact time 113, and so sends a request 112 to the cell searcher 46 for this pause. After the cell searcher pauses the inter-frequency search activity 110, an acknowledgement 114 is returned to the system controller 58.

Figure 5:
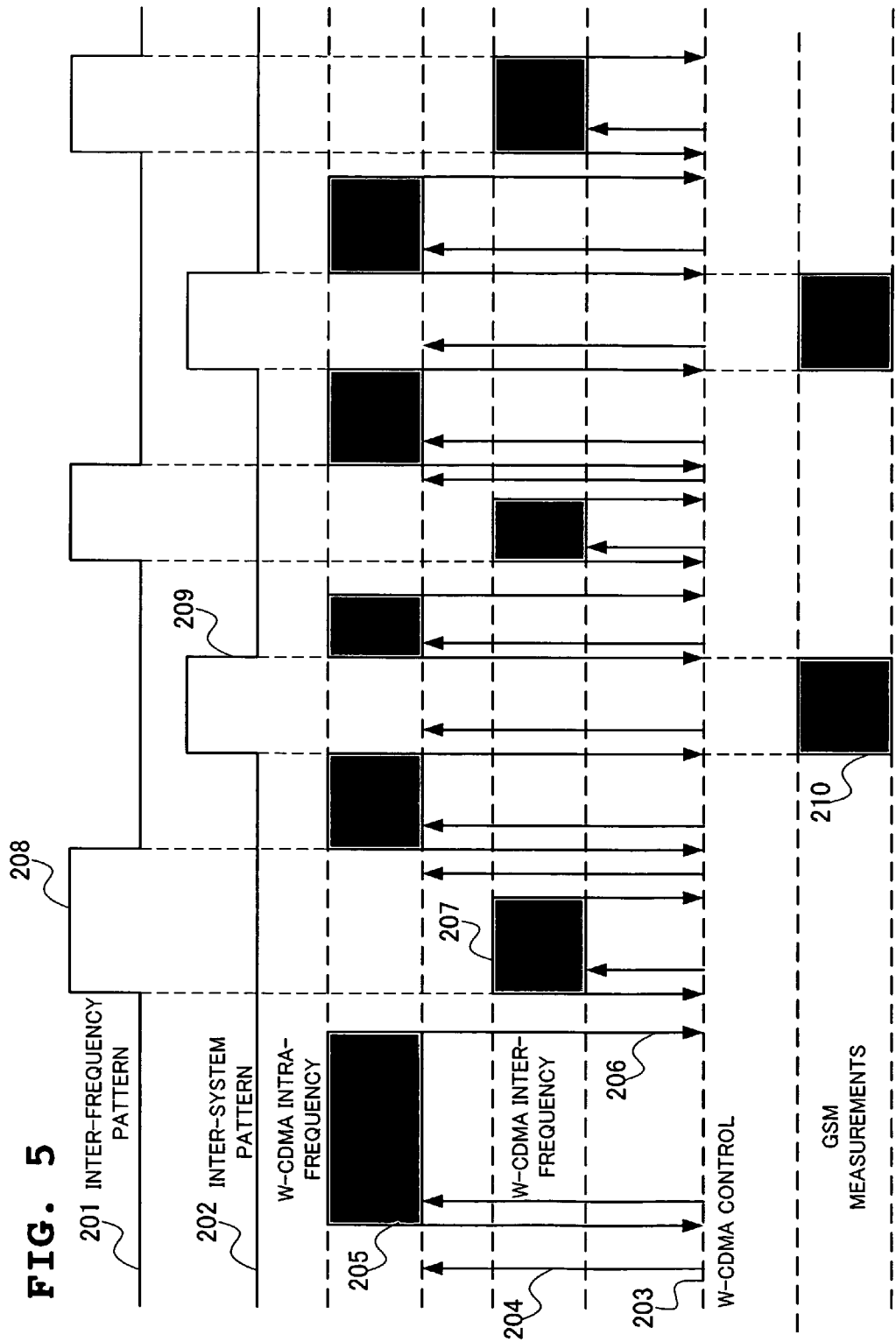
FIG. 5 is a timing diagram illustrating operation of the mobile station shown in FIG. 2 during intra-frequency, inter-frequency and inter-system cell search activity.

FIG. 5 illustrates an example of the mobile station 28 performing not only intra-frequency cell search activities and inter-frequency cell search activities but also inter-system cell search activities. The mobile terminal 28 schedules the different cell search activities to that inter-frequency measurements are performed within a compressed mode pattern 201, inter-system measurements are performed within a different compressed mode pattern 202 and intra-frequency measurements are performed outside of any compressed mode patterns 203. Intra-frequency activity bursts 205 are interleaved with inter-frequency bursts 207 and inter-system bursts 210.

The W-CDMA cell searcher block 46 is controlled using the above described request/acknowledgment mechanism, for example using request 204 and acknowledgement 206 in relation to the intra-frequency activity burst 205. The inter-frequency activity bursts 207 occur during repetitive transmission sequence gaps 208 provided in the inter-frequency pattern 201 whilst the inter-frequency activity bursts 210 are scheduled to occur during transmission gap sequences 209 in the inter-system pattern 202. The mobile station 28 performs the above specified process by issuing pause and resume commands to the cell searcher block 46 so that the pause and resume times corresponds to the edges of the compressed mode patterns represented in FIG. 5.

The mobile station 28 acts to determine whether a pause or resume command for intra-frequency cell search activity, inter-frequency cell search activity or inter-system cell search activity by retrieving commands from a pre-calculated temporary table maintained in the volatile memory 62. Each command is retrieved from the table in sequence and executed by the system controller 58. Advantageously, the use of a pre-calculated table in this way results in a simple and fast process, requiring minimum use of processing and energy resources in the mobile station, since looking up a command from a pre-calculated table is all that is required for executing of two or more interleaved cell search processes.

The table of pause and resume commands is calculated, in this exemplary embodiment as follows. Initially all actively compressed mode gap patterns are decomposed to regular periodic patterns of discreet pause and resume commands. It is to be understood that whilst compressed mode gap patterns, or any other patterns of burst mode activity, to regular periodic patterns of discreet pause and resume commands. This is made possible due to the fact that the element 3GPP standard specifies burst mode gaps in such a way that the gaps consist of periodically repeated groups of individual gaps.

Figure 6:
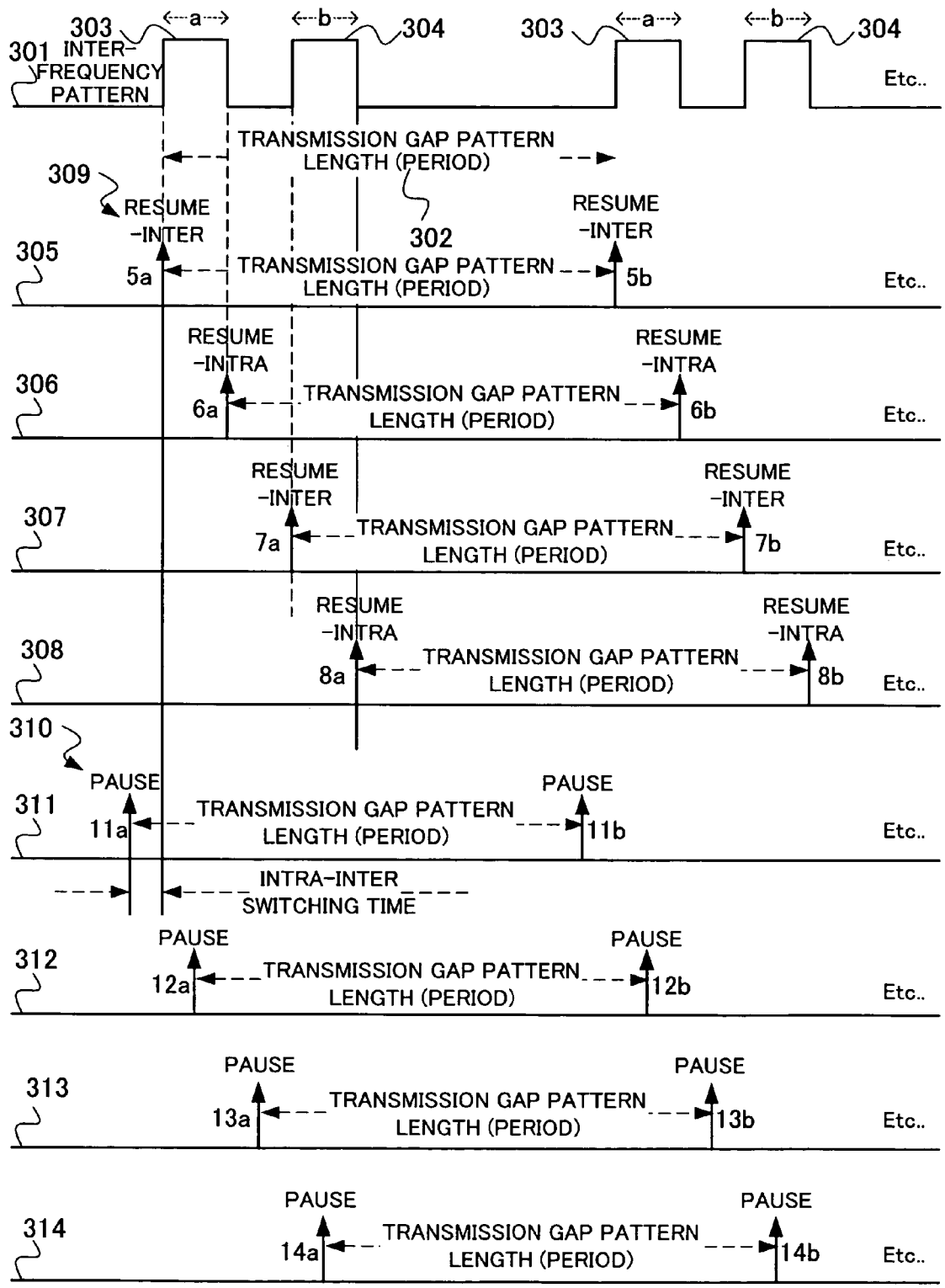
FIG. 6 is a timing diagram illustrating the decomposition of active burst mode patterns carried out in the mobile terminal shown in FIG. 2.

For example, in FIG. 6, an inter-frequency compressed mode gap pattern 301 is represented as including two regularly occurring compressed mode transmission gaps 303 and 304. A standard transmission gap pattern period 302 separates each of the compressed mode transmission 303 from each other as well as each of the compressed mode transmission gaps 304 from each other. The generated sequences of commands corresponding to the compressed mode edges are called gap start times and gap end times. As shown in FIG. 6, the inter-frequency compressed mode gap pattern 301 can be decomposed into regular periodic gap patterns 305, 306, 307 and 308. The gap start and gap end times for each of the compressed mode transmission gaps 303 and 304 are separated by the same standard transmission gap period 302.

Other types of bursty activity, such as measurements aligned with paging occasions or measurements aligned with forward access channel measurement occasions can similarly be decomposed into regular periodic patterns of commands in the same fashion. The above-described decomposition step is dependent on what type of bursty measurement is being performed, however the rest of the scheduling process described is generic to all types of bursty activity.

In some embodiments of the invention, it will be advantageous to generate additional commands in order to handle various physical limitations of the mobile terminal 28. For example, a typical combination of a cell search device and receiver control circuitry may require time to switch from intra-frequency measurements to inter-frequency measurements and vice versa. For this reason, it may be necessary to generate an additional command for each compressed mode edge. As shown in FIG. 6, the command for start of the inter-frequency gap 309 may be required to be preceded by a pause command 310 following the same mechanism, the command patterns 311, 312, 313 and 314 may be generated from the command patterns 305, 306, 307 and 308. Accordingly, the compressed mode pattern 301 has been decomposed by the system controller 58 into eight patterns of commands 305 to 314, whereby each pattern is regular and periodic. This decomposition step is referenced 402 in FIG. 7.

Commands from all regular command patterns are then stored in a temporary table in the volatile memory 62 at step 404. For each command, the command type and the exact time when the command should be executed by the system controller 58 are stored. At this stage the order of storage of the commands is unimportant and it is preferable to store commands from each of the patterns 305 to 314 consecutively, without regard to the command times at this stage. For example, referring once again to FIG. 6, the command pattern 305 may be stored in the memory fully, before proceeding to command pattern 306. Commands may be progressively added to the temporary table through all existing patterns or until the temporary table is full. This processing step of adding commands into a temporary memory table may advantageously by optimized in an implementation of the invention involving a digital signal processor that enables fast execution Of repetitive memory operations.

Figure 8:
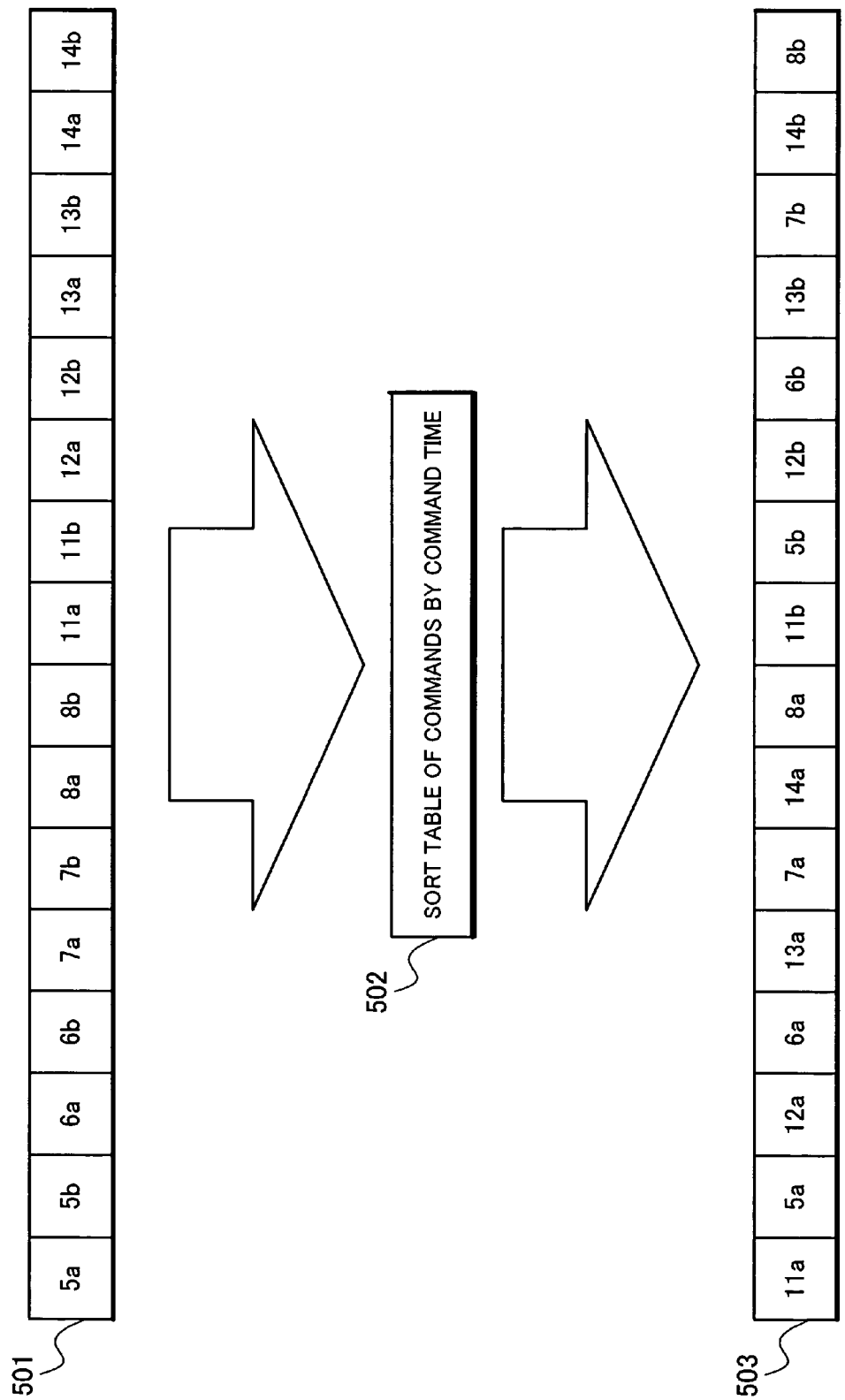
FIG. 8 is a schematic diagram illustrating the sorting of commands maintained in a temporary table during one step of the cell search activity scheduling illustrated in FIG. 7.

An exemplary illustration of the arrangement of the commands in the Temporary table at this stage is denoted 501 in FIG. 8. From this figure, it can be seen that the command names (5a, 5b, etc) corresponds to the command names represented in FIG. 6. The representative example is illustrative Only, showing only two periods of compressed mode gap groups. In reality, the number of repetitions is likely to be large and therefore the benefit from optimizing the method of generating the command table is optimized. The number of repetitions is referred to as the "transmission gap repetition count" in the 3GPP standards documents.

At step 406, all commands in the temporary table are sorted by the system controller 58 in ascending order according to desired execution time. The step is reference 502 in FIG. 8. Advantageously, the sorting algorithm used by the system controller 58 is a "Shell Sort" algorithm, namely a fast general purpose sorting algorithm not requiring recursion. Alternately, if no severe memory restraints are imposed upon the System controller 58, an optimized solution is the recursive algorithm "Quick Sort". As a result of this step, the temporary table of commands is now ordered according to desired execution time. The final arrangement of the commands in the table is referenced 503 in FIG. 8. Once again, the command names (5a, 5b etc) correspond to the command names referenced in FIG. 6. Optionally, the sorted table can now be checked for incorrect specified patterns, such as overlapping gaps or gaps that are to close to each other and violate physical limitations of the mobile terminal 28.

The table of pause and resume commands maintained in the volatile memory 62 is calculated by the system controller 58 when the system controller 58 determines that burst mode cell search activity is required, namely that there is a new need to interleave two or more of inter-frequency, intra-frequency or inter-system measurements. The table is also calculated when cell search activities are already being performed and the final command from the temporary table has been issued, so that the table needs to be re-filled. Further, the table is calculated when new command patters are provided by the network 12 to the mobile station 28 while cell search activity is already in progress. The provision of new patterns may require the addition of patterns, deletion of patterns or modification of currently active patterns by the system controller 58.

Figure 7:
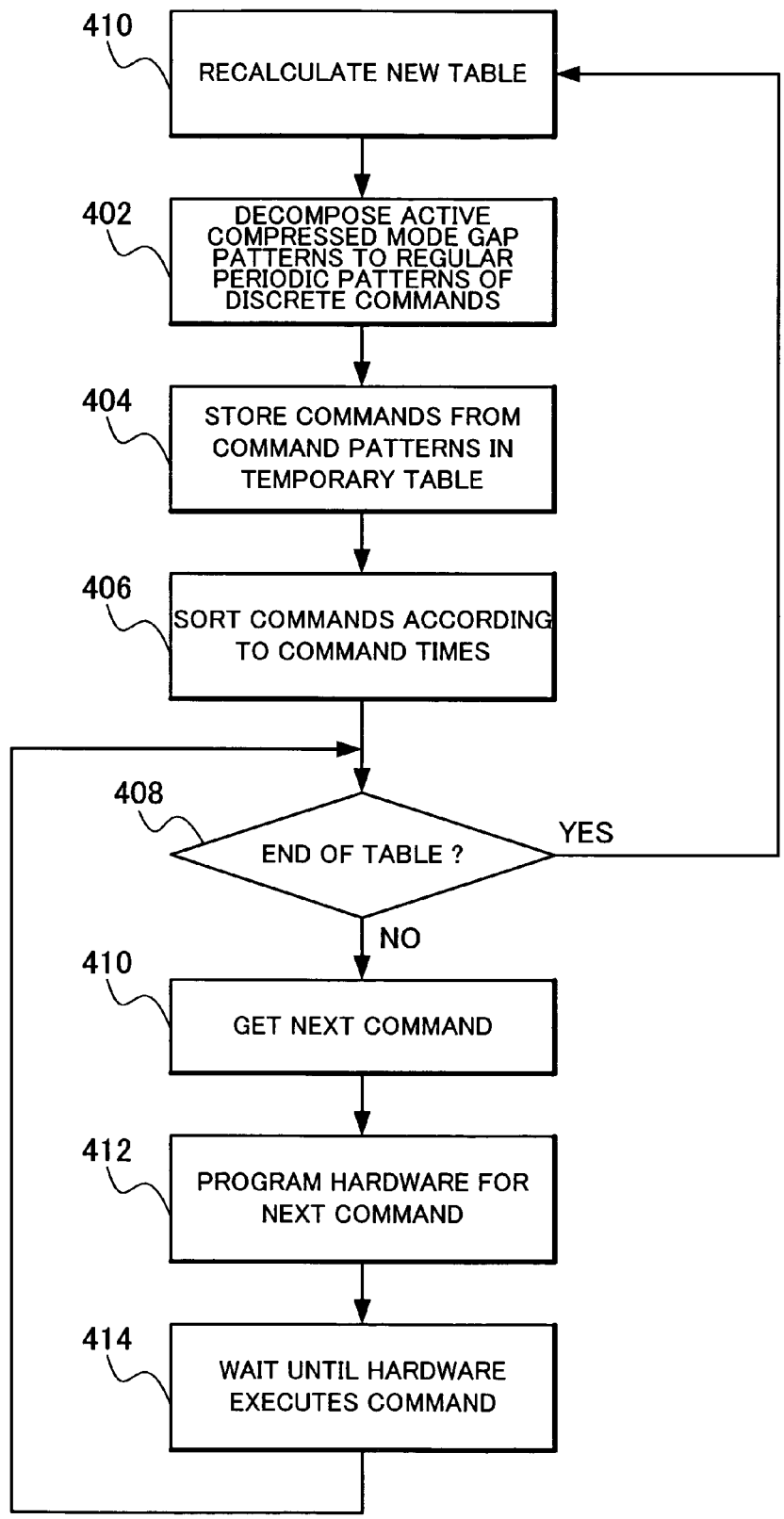
FIG. 7 is a flow chart illustrating the steps performed by the mobile station shown in FIG. 2 during cell search activity scheduling.

Referring once again FIG. 7, the mobile terminal 58 commences cell search activity by sequentially executing the commands from the table stored in the volatile memory 62 by initially determining at step 408 if the end of the table has been reached. If this is the case, then a new table of pause and resume commands is calculated at step 410. The decomposition storage and sorting steps referenced 402 to 406 are then subsequently performed.

Alternatively, if the end of the table has not been reached, then the next command is obtained from the temporary table by the system controller at step 410 for execution. At step 412, the hardware in the mobile station 28 that is required to execute that command is programmed by the system controller 58 so that that command is executed at the desired command time. At step 414, the system controller 58 waits until the hardware has executed that current command, and then repeats steps 408 to 412 until all commands have been executed.

Finally, it is to be understood that various modifications and/or additions may be made to the cell search scheduling method without departing from the spirit or ambit of the present invention.

The invention claimed is:

1. A method of scheduling cell search activity executed by a mobile communication user terminal which includes a control device and a data storage device, during a transmission gap sequencing in a burst mode, the method comprising:
   maintaining, as executed by the control device and as stored in the data storage device, a table of regular periodic patterns of discreet cell search commands for execution during the transmission gap sequences, wherein the commands are ordered by the desired execution times; and
   sequentially executing, as executed by the control device, commands in the table stored in said data storage device at the desired execution time.

2. A method according to claim 1, wherein the cell search commands include pause and resume commands for pausing and resuming any two or more of intra-frequency, inter-frequency, or inter-system cell search activity.

3. A method according to claim 2, wherein the burst mode includes a W-CDMA compressed mode.

4. A method according to claim 1, further including calculating, as executed by the control device, the table of regular periodic patterns of discreet cell search commands under one or more predefined conditions.

5. A method according to claim 4, wherein the predefined conditions include when the burst mode is required and when there is a need to interleave separate cell search activities.

6. A method according to claim 4, wherein the predefined conditions include when cell search activities are required to be performed and when a final command from the table has been executed.

7. A method according to claim 4, wherein the predefined conditions include when new patterns of discreet cell search commands are received from a communications network while cell search activities are currently being executed.

8. A method according to claim 1, further including calculating, as executed by the control device, the table of regular periodic patterns of discreet cell search commands by:
   decomposing all active burst mode patterns into regular periodic patterns of discreet commands;
   storing the discreet cell search commands and a command execution time in the table; and
   sorting the commands in the table according to the desired execution time.

9. A method according to claim 2, further including calculating, as executed by the control device, the table of regular periodic patterns of discreet cell search commands under one or more predefined conditions.

10. A method according to claim 3, further including calculating, as executed by the control device, the table of regular periodic patterns of discreet cell search commands under one or more predefined conditions.

11. A method according to claim 5, wherein the predefined predefined conditions include when cell search activities are required to be performed and when a final command from the table has been executed.

12. A method according to claim 5, wherein the predefined conditions include when new patterns of discreet cell search commands are received from a communications network while cell search activities are currently being executed.

13. A method according to claim 6, wherein the predefined conditions include when new patterns of discreet cell search commands are received from a communications network while cell search activities are currently being executed.

14. A method according to claim 2, further including calculating, as executed by the control device, the table of regular periodic patterns of discreet cell search commands by:
   decomposing all active burst mode patterns into regular periodic patterns of discreet commands;
   storing discreet commands and a command execution time in the table; and
   sorting the commands in the table according to a desired execution time.

15. A method according to claim 3, further including calculating, as executed by the control device, the table of regular periodic patterns of discreet cell search commands by:
   decomposing all active burst mode patterns into regular periodic patterns of discreet commands;
   storing discreet commands and a command execution time in the table; and
   sorting the commands in the table according to a desired execution time.

16. A method according to claim 4, further including calculating, as executed by the control device, the table of regular periodic patterns of discreet cell search commands by:
   decomposing all active burst mode patterns into regular periodic patterns of discreet commands;
   storing discreet commands and a command execution time in the table; and
   sorting the commands in the table according to a desired execution time.

17. A method according to claim 5, further including calculating, as executed by the control device, the table of regular periodic patterns of discreet cell search commands by:
   decomposing all active burst mode patterns into regular periodic patterns of discreet commands;
   storing discreet commands and a command execution time in the table; and
   sorting the commands in the table according to a desired execution time.

18. A mobile communication user terminal, including:
   a data storage device for maintaining a table of regular periodic patterns of discreet cell search commands for execution during transmission gap sequences in a burst mode, wherein the commands are ordered by the desired execution times; and
   a control device for scheduling cell search activity according to the method of claim 1.

* * * * *